(12) United States Patent
Zou et al.

(10) Patent No.: US 11,204,535 B2
(45) Date of Patent: Dec. 21, 2021

(54) SILICON-BASED LITHIUM NIOBATE FILM ELECTRO-OPTIC MODULATOR ARRAY AND INTEGRATION METHOD THEREOF

(71) Applicant: Shanghai Jiao Tong University, Shanghai (CN)

(72) Inventors: Weiwen Zou, Shanghai (CN); Shaofu Xu, Shanghai (CN); Jing Wang, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 72 days.

(21) Appl. No.: 16/688,869

(22) Filed: Nov. 19, 2019

(65) Prior Publication Data

US 2020/0363693 A1  Nov. 19, 2020

(30) Foreign Application Priority Data

May 17, 2019 (CN) .......................... 201910410940.0
May 17, 2019 (CN) .......................... 201910410956.1

(51) Int. Cl.
*G02F 1/225* (2006.01)
*G02F 1/035* (2006.01)
(Continued)

(52) U.S. Cl.
CPC ............ *G02F 1/225* (2013.01); *G02B 6/4279* (2013.01); *G02F 1/015* (2013.01); *G02F 1/035* (2013.01);
(Continued)

(58) Field of Classification Search
CPC .......... G02F 1/225; G02F 1/035; G02F 1/217; G02B 6/4279; G02B 2006/12038;
(Continued)

(56) References Cited

U.S. PATENT DOCUMENTS

2016/0357086 A1* 12/2016 Jewart ...................... G02B 6/00

FOREIGN PATENT DOCUMENTS

CN    2531411 Y    1/2003
CN    106990642 A  7/2017
(Continued)

OTHER PUBLICATIONS

M. He, et al., "High-performance silicon and lithium niobate Mach-Zehnder modulators for 100 Gbit/s and beyond," Nature Photonics, https://doi.org/10.1038/s41566-019-0378-6 (2019).
(Continued)

*Primary Examiner* — Leslie C Pascal
(74) *Attorney, Agent, or Firm* — Mei & Mark LLP; Manni Li (57) ABSTRACT

Integration method of a large-scale silicon-based lithium niobate film electro-optic modulator array. By using the method, the difficulty of a fabrication process of a lithium niobate crystal layer is reduced, requirements on precision of bonding lithium niobate and silicon is reduced, and fabrication and bonding of the large-scale array lithium niobate crystal layer can be completed at one time, so that production efficiency of the silicon-based lithium niobate film electro-optic modulator array is greatly improved; through design and optimization of the structure of the silicon crystal layers, light can be naturally alternated and mutually transmitted in silicon waveguides and lithium niobate waveguides, and a high-performance electro-optic modulation effect of the lithium niobate film is achieved.

16 Claims, 4 Drawing Sheets

(51) Int. Cl.
  *G02B 6/42* (2006.01)
  *G02F 1/015* (2006.01)
  *G02B 6/12* (2006.01)
  *G02F 1/21* (2006.01)

(52) U.S. Cl.
  CPC ............ *G02B 2006/1204* (2013.01); *G02B 2006/12038* (2013.01); *G02B 2006/12061* (2013.01); *G02B 2006/12176* (2013.01); *G02B 2006/12188* (2013.01); *G02F 1/217* (2021.01)

(58) Field of Classification Search
  CPC .. G02B 2006/1204; G02B 2006/12061; G02B 2006/12147; G02B 2006/1215; G02B 2006/12059; G02B 2006/12107
  See application file for complete search history.

(56) References Cited

FOREIGN PATENT DOCUMENTS

| CN | 105044931 B | 10/2018 |
| CN | 109116590 A | 1/2019 |
| WO | WO-2019218385 A1 * | 11/2019 |

OTHER PUBLICATIONS

Y. Shen, et al., "Photonic Neural Networks: Deep learning with coherent nanophotonic circuits," Nature Photonics, vol. 11, pp. 441-446 (2017).

* cited by examiner

FIG. 1A

| Lithium niobate film layer | radio-frequency electrode layer |
|---|---|
| adhesive layer ||
| silicon waveguide layer | direct-current bias electrode layer |
| silicon dioxide film layer ||
| silicon crystal substrate layer ||

SILICON-BASED LITHIUM NIOBATE FILM ELECTRO-OPTIC MODULATOR ARRAY AND INTEGRATION METHOD THEREOF

CROSS-REFERENCE TO RELATED APPLICATION

The subject application claims priority on Chinese patent application nos. 201910410940.0 and 201910410956.1, both filed on May 17, 2019 in China. The contents and subject matter of the Chinese priority applications are incorporated herein by reference.

TECHNICAL FIELD

The present invention relates to optoelectronic integrated devices, in particular to a silicon-based lithium niobate film electro-optic modulator array and an integration method thereof.

BACKGROUND ART

Electro-optic modulators load electrical signals onto optical signals and serve as signal input interfaces of optical signal processing systems for optical communication, microwave photon radar, and the like. The performance of the optical signal processing systems directly depends on the performance of the electro-optic modulators, making the electro-optic modulators important photonic devices. In order to integrate the electro-optic modulators on a chip, the electro-optic modulators utilizing a standardized silicon-based integration process appeared (see CN105044931B to Ding, J. et al.). Doped silicon is used as a light guiding medium, and the effective refractive index of a doped silicon waveguide can be changed by controlling the electrode to achieve phase modulation or form a two-arm interference structure, and phase modulation is in turn converted into intensity modulation. However, the use of the doped silicon as a light guiding medium brings several problems as follows: doped silicon can absorb light, which may obviously increase the insertion loss of the electro-optic modulators; and the modulation efficiency of the doped silicon is low, so that the half-wave voltage is usually designed to be high, and the conversion rate of the electro-optic modulation is reduced.

In order to overcome the above difficulties, researchers have developed a novel silicon-based lithium niobate heterointegrated electro-optic modulator by using lithium niobate as a light guiding medium (see M. He, et al, "High-performance silicon and lithium niobate Mach-Zehnder modulators for 100 Gbit/s and beyond," Nature Photonics, https://doi.org/10.1038/s41566-019-0378-6, 2019). According to the technology, a silicon crystal is used as a light guiding medium in a Y-branch part of the electro-optic modulator, and the advantage in efficiency of a standardized production line is fully utilized; a lithium niobate crystal is used as a light guiding material in an electro-optic effect part, and the defects of silicon are ingeniously solved by virtue of the advantages of low loss and high electro-optic efficiency of the lithium niobate crystal. In addition, the lithium niobate crystal has advantage of ultra-high bandwidth range, and is more adaptive to requirements of future ultra-high speed optical signal processing systems. At present, mixed integration of lithium niobate films and silicon is usually carried out by epitaxial growth or bonding. Due to characteristic low technical difficulty and high yield, the bonding method is mostly adopted. However, the bonding method has remarkable characteristic of low production efficiency and cannot be applied to fabricating large-scale silicon-based lithium niobate film electro-optic modulator arrays.

Existing complex photon signal processing systems (e.g., multi-channel photon analog-to-digital conversion systems, see Chinese Patent CN201710401304.2 to ZOU Weiwen et al.; Y. Shen, et al., "Photonic Neural Networks: Deep learning with coherent nanophotonic circuits," Nature Photonics, Vol. 11, pp. 441-446 (2017)) require the number of the electro-optic modulators to increase geometrically. How to integrate and fabricate large-scale arrays of lithium niobate film electro-optic modulators with excellent performance is the bottleneck of further application of this technology.

SUMMARY OF THE INVENTION

An object of the present invention is to overcome the defects in the current technology, and provide a large-scale silicon-based lithium niobate film electro-optic modulator array and an integration method thereof, in which the difficulty of a fabrication process of a lithium niobate crystal layer is reduced through structural design, requirements on precision of bonding lithium niobate and silicon is reduced, and fabrication and bonding of the large-scale array lithium niobate crystal layer can be completed at one time, so that production efficiency of the silicon-based lithium niobate film electro-optic modulator array is greatly improved. Through design and optimization of the structure of the silicon crystal layers, light can be naturally alternated and mutually transmitted in silicon waveguides and lithium niobate waveguides, and a high-performance electro-optic modulation effect of the lithium niobate film is achieved. In addition, according to the method of the present invention, the advantage in maturity of the standardized silicon-based integration technology is utilized, and a complex chip fabrication process is concentrated in the silicon crystal layers, so that technology errors in the chip fabrication process are reduced, and performance stability of the whole silicon-based lithium niobate film electro-optic modulator array is guaranteed.

The technical solution of the present invention is as follows:

The present invention provides a large-scale silicon-based lithium niobate film electro-optic modulator array structure, comprising, from bottom to top in sequence, a silicon crystal substrate layer, a silicon dioxide film layer, silicon waveguide layers and a lithium niobate film layer, wherein an adhesive layer is arranged between the silicon waveguide layers and the lithium niobate film layer for bonding the silicon waveguide layers and the lithium niobate film layer, a direct-current bias electrode layer is arranged in regions where a direct-current bias is to be applied to the silicon waveguide layers, and a radio-frequency electrode layer is arranged in regions where a radio-frequency signal is to be applied to the lithium niobate film layer.

In the present invention, the silicon crystal substrate layer, the silicon dioxide film layer, the silicon waveguide layers, the adhesive layer, the lithium niobate film layer, the direct-current bias electrode layer, and the radio-frequency electrode layer form a plurality of silicon-based lithium niobate film electro-optic modulators which are periodically arranged.

In the present invention, all of the components described are wafer-level large-scale arrays. A plurality of periodic structures are simultaneously fabricated on each layer at one time, so that a large-scale silicon-based lithium niobate film electro-optic modulator array can be fabricated at one time. As the array is a periodically repeating structure, the function of every component will be described below in the structure of one silicon-based lithium niobate film electro-optic modulator, and working principles and processes of the components will be described.

In the present invention, in one silicon-based lithium niobate film electro-optic modulator, the silicon crystal substrate layer provides a substrate material for integrating the silicon-based lithium niobate film electro-optic modulator; the silicon dioxide film layer can be formed by performing an oxidation process above the silicon crystal substrate layer, and the silicon dioxide film layer serves as a lower cladding layer for the optical waveguide and provides a binding effect on light in the waveguide; the silicon waveguide layer is formed by silicon crystal growth above the silicon dioxide film layer; a waveguide interconnection structure including optical splitters and optical couplers is formed by performing dry etching or wet etching on the silicon waveguide layer, and the silicon waveguide layer serves as a core of the optical waveguide and can provide functions of light splitting, coupling, direct-current biasing and light guiding in partial regions; the adhesive layer is located above the silicon waveguide layer and can be used for bonding the silicon waveguide layer and the lithium niobate film layer; the lithium niobate film layer is located above the adhesive layer and is a complete lithium niobate wafer subjected to etching and used for light guiding in partial regions and radio-frequency signal application. Ridge structures are formed on the lithium niobate film layer by etching and used for enhancing the binding effect on light during light guiding; a direct-current bias voltage can be applied to the direct-current bias electrode layer to generate an electric field in one section of the silicon waveguide layer so as to change an effective refractive index in the section, so that a phase change of light is caused; and a radio-frequency signal can be applied to the radio-frequency electrode layer to generate an electric field in one section of the lithium niobate film layer so as to change an effective refractive index in the section, so that a phase change of light is caused.

In the present invention, the principles and processes of one silicon-based lithium niobate film electro-optic modulator are described as follows:

each silicon-based lithium niobate film electro-optic modulator comprises one optical input port, one or two optical output ports, one direct-current input port and one radio-frequency input port. During modulation, a material that guides light alters in different processes: in light splitting and direct-current biasing processes, the material that guides light is the silicon waveguide layer; and in a radio-frequency signal application process, the material that guides light is the lithium niobate film layer. Light is input through the optical input port, is transmitted in the silicon waveguide layer, and is equally split into two beams of light with equal intensity by the optical splitter in the silicon waveguide layer to enter two arms of the modulator. A direct-current bias signal is input through the direct-current input port and is applied to the direct-current bias electrode layer to generate an electric field in the silicon waveguide layer so as to influence the effective refractive index of the silicon waveguide layer. When the two beams of light pass through, phase changes are accumulated, and a direct-current biasing process is completed. After the direct-current biasing process is completed, the light passes through the optical coupler structure in the silicon waveguide layer, so that the two beams of light enter the lithium niobate film layer to be transmitted. A radio-frequency signal is input through the radio-frequency input port and is applied to the radio-frequency electrode layer to generate an electric field in one section of the lithium niobate film where the light passes through, and a change in the effective refractive index is caused, so that the two beams of light passing through the lithium niobate film accumulate different phase differences, and the radio-frequency signal application process is completed. After the radio-frequency signal application process is completed, the light returns again to the silicon waveguide layer to be transmitted under the action of the optical coupler in the silicon waveguide layer, and under the action of another light splitter, the two beams of light that accumulate different phase differences interfere to form one beam of light or two beams of light for output. In the interference process, the phase differences are converted into intensity changes of the light, so that intensity modulation of light is completed.

In the present invention, the optical splitters can be multimode interferometer structures or evanescent wave optical splitter structures.

In the present invention, the optical couplers can be waveguide grating couplers or evanescent wave couplers.

In the present invention, the adhesive layer may be made of benzocyclobutene (BCB).

The present invention further provides a large-scale integration method of the silicon-based lithium niobate film electro-optic modulator array. By using the method of the present invention, the large-scale silicon-based lithium niobate film electro-optic modulator array can be simultaneously fabricated at one time.

The present invention further provides an integration method of the silicon-based lithium niobate film electro-optic modulator array, comprising the following steps:

(1) oxidizing a smooth silicon crystal substrate by thermal oxidation to form a silicon dioxide film layer;

(2) depositing polycrystalline silicon with a certain thickness on the silicon dioxide film layer by chemical vapor deposition (CVD), and forming silicon waveguide layers with a plurality of silicon-based lithium niobate film electro-optic modulators arranged in an array by dry etching or wet etching, wherein the silicon waveguide layers include optical splitters and optical couplers of all the electro-optic modulators arranged in the array, an input terminal of each optical splitter is an incident light port, and an output terminal of each optical coupler is a modulated light output port; and optical output ports and optical input ports between the modulators are interconnected to form a cascading, parallel or hybrid structure;

(3) for each electro-optic modulator in the array, performing ion implantation on two sides of the silicon waveguide where a direct-current voltage is to be applied, wherein phosphorus ions are implanted on one side while boron ions are implanted on the other side to form a PN junction across the silicon waveguide;

(4) forming a metal layer on the silicon waveguide layers by chemical vapor deposition, and removing excess metal by a dry etching process to form metal connection lines only above the PN junctions and form metal lines connected to the outside such that a direct-current bias electrode layer and direct-current bias input ports are made;

(5) etching a wafer-level lithium niobate wafer by dry etching or wet etching to form periodic ridge structures to fabricate a lithium niobate film layer, wherein the lithium niobate film layer covers all the N silicon waveguide layers arranged in the array;

(6) aligning the ridge structures on the lithium niobate film layer with the optical couplers arranged in the array in the silicon waveguide layers, and bonding the lithium niobate film layer and the silicon waveguide layers by using an adhesive; and (7) forming a metal layer on the lithium niobate film layer by chemical vapor deposition, and then removing excess metal by dry etching or wet etching while only leaving, for each electro-optic modulator, radio-frequency metal electrodes in regions where a radio-frequency signal is to be applied and radio-frequency electrode metal connection lines connected to the outside to form a radio-frequency electrode layer and radio-frequency signal input ports; thus obtaining an array integrating N electro-optic modulators having 2*N optical splitters arranged in the array, 2*N optical couplers arranged in the array, N direct-current voltage input ports and N radio-frequency input ports.

Compared with the current technology, the silicon-based lithium niobate film electro-optic modulator array and the integration method thereof provided by the invention have the following advantages:

1. Complex structures such as modulator interconnection, optical splitters, breakpoints and optical couplers are realized in the silicon waveguide layers, and functional effectiveness and stability of the large-scale silicon-based lithium niobate film electro-optic modulator array are guaranteed.

2. By virtue of the design of the periodic structure, the large-scale silicon-based lithium niobate film electro-optic modulator array can be fabricated simultaneously at one time, besides, the lithium niobate film layer does not need to be cut, and the difficulty of bonding the modulator array is as same as that of bonding a single modulator, so that the structure provided by the invention can greatly improve fabrication efficiency of the large-scale silicon-based lithium niobate film electro-optic modulator array, thereby providing strong support for complex photon signal processing systems.

3. By utilizing the silicon-based lithium niobate film electro-optic modulator integration technology, the radio-frequency signal is applied to the lithium niobate film layer, and the advantages of high electro-optic efficiency, low insertion loss and ultra-high modulation bandwidth of lithium niobate are exerted. The silicon-based lithium niobate film electro-optic modulator array and the integration method thereof can play a role in low-power consumption large-bandwidth microwave photon applications.

BRIEF DESCRIPTION OF THE DRAWINGS

FIGS. 1A to 1D are structure schematic diagrams showing the silicon-based lithium niobate film electro-optic modulator array in one embodiment of the present invention, wherein FIG. 1A shows the top view of the structure, FIG. 1B shows the longitudinal section of the structure, FIG. 1C shows the periodic ridge structures of the lithium niobate film layer, and FIG. 1D shows the arrangement of silicon waveguide layers in a grid form in the present invention.

FIGS. 2A to 2C are structure schematic diagram showing one silicon-based lithium niobate film electro-optic modulator in one embodiment of the present invention, wherein FIG. 2A shows the top view of the structure diagram, where the horizontal arrow on the left side represents the direction of the incident light, and the horizontal arrow on the right side represents the direction of the modulated light; FIG. 2B shows the longitudinal sectional view of the structure corresponding to ridge structures of a lithium niobate film layer, i.e., regions where arrows in the figure point to, from the direction marked with letter B in FIG. 2A; and FIG. 2C shows the longitudinal sectional view of the structure corresponding to direct-current biasing and an radio-frequency electrode layer, i.e., regions where arrows in the figure point to, from the direction marked with letter C in FIG. 2A.

FIGS. 3A and 3B are schematic diagrams showing the optical mode field distribution in one embodiment of the present invention, wherein

FIGS. 5A to 5C show waveguide interconnection structures that may be employed in the present invention, wherein FIG. 5A shows a cascading structure, FIG. 5B shows a parallel structure, and FIG. 5C shows a hybrid structure in the present invention.

DETAILED DESCRIPTION OF THE INVENTION

The technical scheme of the invention is described below in detail with reference to the accompanying drawings and the embodiments, and detailed implementations and structures are provided, but the protection scope of the invention is not limited to the following embodiments.

Referring to FIGS. 1A to 1D, which show partial structure schematic diagram of a silicon-based lithium niobate film electro-optic modulator array according to the embodiment of the present invention, an integration method of the silicon-based lithium niobate film electro-optic modulator array according to the present invention comprises the following steps that:

(1) a smooth silicon crystal substrate 2 is oxidized by thermal oxidation to form a silicon dioxide film layer 3;

(2) polycrystalline silicon with a certain thickness is deposited on the silicon dioxide film layer 3 by chemical vapor deposition (CVD), and silicon waveguide layers 4 with a plurality of silicon-based lithium niobate film electro-optic modulators 1 arranged in an array are formed by dry etching or wet etching, wherein the silicon waveguide layers 4 include optical splitters 41 and optical couplers 42 of all the electro-optic modulators arranged in the array, an input terminal of each optical splitter 41 is an incident light port, and an output terminal of each optical coupler 42 is a modulated light output port; and optical output ports and optical input ports between the modulators are interconnected to form a cascading, parallel or hybrid structure;

(3) for each electro-optic modulator 1 in the array, ion implantation is performed on two sides of the silicon waveguide 4 where a direct-current voltage is to be applied, wherein phosphorus ions are implanted on one side while boron ions are implanted on the other side to form a PN junction across the silicon waveguide;

(4) a metal layer is formed on the silicon waveguide layers 4 by chemical vapor deposition, and excess metal is removed by a dry etching process to form metal connection lines only above the PN junctions and form metal lines connected to the outside such that a direct-current bias electrode layer 7 and direct-current bias input ports are made;

(5) a wafer-level lithium niobate wafer is etched by dry etching or wet etching to form periodic ridge structures to fabricate a lithium niobate film layer 6, wherein the lithium niobate film layer 6 covers all the N silicon waveguide layers 4 arranged in the array;

(6) the ridge structures on the lithium niobate film layer 6 are aligned with the optical couplers 42 arranged in the array in the silicon waveguide layers 4, and the lithium niobate film layer 6 and the silicon waveguide layers 4 are bonded by using an adhesive 5; and (7) a metal layer is formed on the lithium niobate film layer 6 by chemical vapor deposition, and then excess metal is removed by dry etching or wet etching while only leaving, for each electro-optic modulator, radio-frequency metal electrodes in regions where a radio-frequency signal is to be applied and radio-frequency electrode metal connection lines connected to the outside to form a radio-frequency electrode layer 8 and radio-frequency signal input ports; thus, an array integrating N electro-optic modulators having 2*N optical splitters 41 arranged in the array, 2*N optical couplers 42 arranged in the array, N direct-current voltage input ports and N radio-frequency input ports is obtained.

Figure 1A:
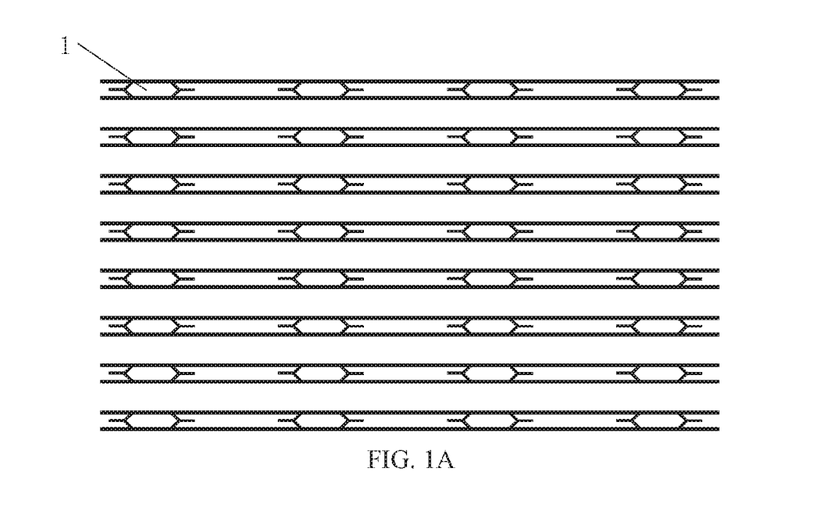
Figure 1B:
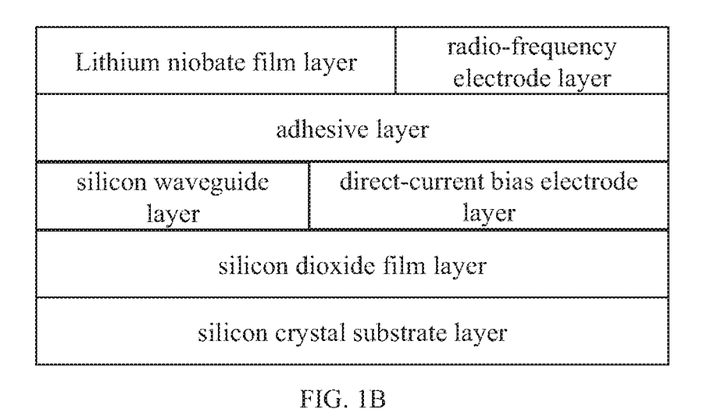
Figure 1C:
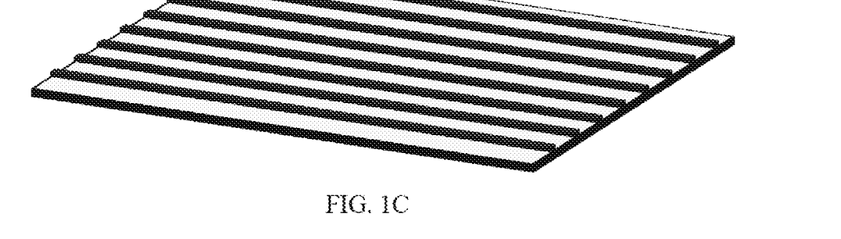

As can be seen in the top view diagram of FIG. 1A, the plurality of silicon-based lithium niobate film electro-optic modulators 1 are simultaneously fabricated on one wafer. The silicon-based lithium niobate film electro-optic modulator array comprises the silicon crystal substrate layer, the silicon dioxide film layer, the silicon waveguide layers, the adhesive layer, the lithium niobate film layer, the direct-current bias electrode layer and the radio-frequency electrode layer. All of the components are wafer-level large-scale arrays. A plurality of periodic structures are simultaneously fabricated in each layer at one time, and a large-scale silicon-based lithium niobate film electro-optic modulator array can be fabricated at one time. As the array is a periodically repeating structure, the function of every component will be described below in the structure of one silicon-based lithium niobate film electro-optic modulator, and working principles and processes of the components will be described.

Figure 2A:
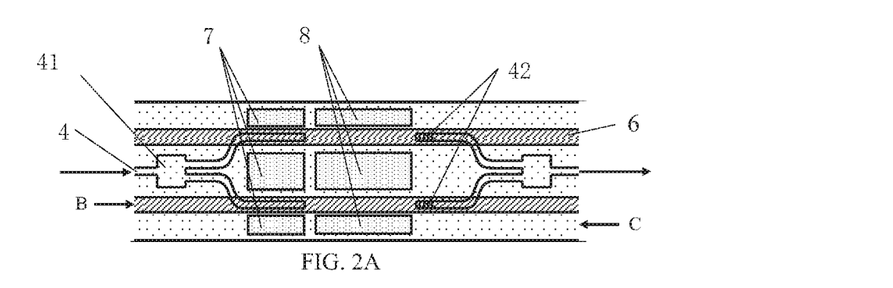

Referring to FIG. 2A, in one silicon-based lithium niobate film electro-optic modulator 1 of the present invention, the silicon crystal substrate layer 2 provides a substrate material for integrating the silicon-based lithium niobate film electro-optic modulator 1; the silicon dioxide film layer 3 can be formed by performing an oxidation process above the silicon crystal substrate layer 2, and the silicon dioxide film layer 3 serves as a lower cladding layer for the optical waveguide and provides a binding effect on light in the waveguide; the silicon waveguide layer 4 is formed by silicon crystal growth above the silicon dioxide film layer 3; a waveguide interconnection structure including optical splitters 41 and optical couplers 42 is formed by performing dry etching or wet etching on the silicon waveguide layer 4, and the silicon waveguide layer 4 serves as a core of the optical waveguide and can provide functions of light splitting, coupling, direct-current biasing and light guiding in partial regions; the adhesive layer 5 is located above the silicon waveguide layer 4 and can be used for bonding the silicon waveguide layer 4 and the lithium niobate film layer 6; the lithium niobate film layer 6 is located above the adhesive layer 5 and is a complete lithium niobate wafer subjected to etching and used for light guiding in partial regions and radio-frequency signal application. Ridge structures are formed on the lithium niobate film layer 6 by etching and used for enhancing the binding effect on light during light guiding; a direct-current bias voltage can be applied to the direct-current bias electrode layer 7 to generate an electric field in one section of the silicon waveguide layer 4 so as to change an effective refractive index in the section, so that a phase change of light is caused; and a radio-frequency signal can be applied to the radio-frequency electrode layer 8 to generate an electric field in one section of the lithium niobate film layer so as to change an effective refractive index in the section, so that a phase change of light is caused.

The principles and processes of one silicon-based lithium niobate film electro-optic modulator 1 are described as follows:

each silicon-based lithium niobate film electro-optic modulator 1 comprises one optical input port, one optical output port, one direct-current voltage input port and one radio-frequency input port. During modulation, a material that guides light alters in different processes: referring to FIGS. 3A and 3B, in light splitting and direct-current biasing processes, the material that guides light is the silicon waveguide layer 4; and in a radio-frequency signal application process, the material that guides light is the lithium niobate film layer 6. Light is input through the optical input port, is transmitted in the silicon waveguide layer 4, and is equally split into two beams of light with equal intensity by the optical splitter 41 in the silicon waveguide layer 4 to enter two arms of the modulator. The optical splitter 41 in the embodiment is a multimode interferer structure. A direct-current bias signal is input through the direct-current input port and is applied to the direct-current bias electrode layer 7 to generate an electric field in the silicon waveguide layer 4 so as to influence the effective refractive index of the silicon waveguide layer 4. When the two beams of light pass through, phase changes are accumulated, and a direct-current biasing process is completed. After the direct-current biasing process is completed, the light passes through the optical coupler 42 structure in the silicon waveguide layer 4, so that the two beams of light enter the lithium niobate film layer 6 to be transmitted. The optical coupler in the embodiment is an evanescent wave coupler. A radio-frequency signal is input through the radio-frequency input port and is applied to the radio-frequency electrode layer 8 to generate an electric field in one section of the lithium niobate film 6 where the light passes through, and a change in the effective refractive index is caused, so that the two beams of light passing through the lithium niobate film accumulate different phase differences, and the radio-frequency signal application process is completed. After the radio-frequency signal application process is completed, the light returns again to the silicon waveguide layer 4 to be transmitted under the action of the optical coupler 42 in the silicon waveguide layer. In the embodiment, this optical coupler is a grating coupler. Under the action of another light splitter 41, the two beams of light that accumulate different phase differences interfere to form one beam of light, and the phase differences are converted into intensity changes of the light, so that intensity modulation of light is completed.

Figure 4:
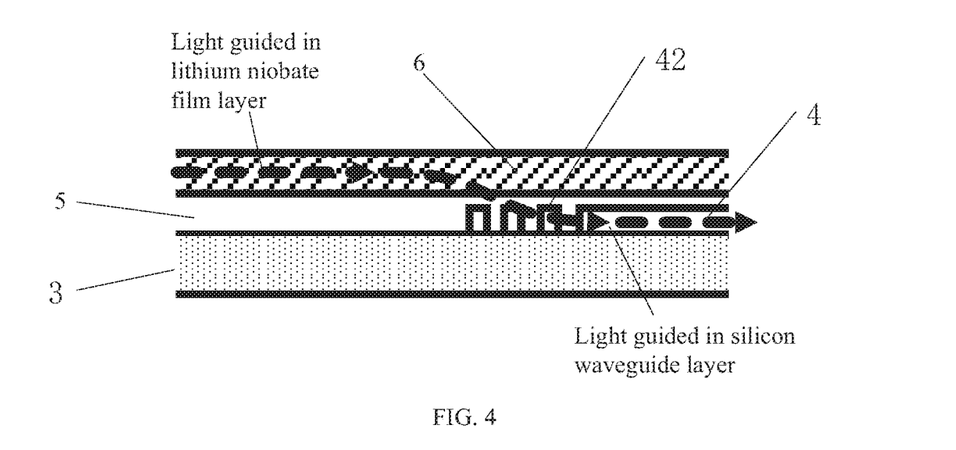
FIG. 4 is a schematic diagram illustrating principles of an optical coupler according to one embodiment of the present invention. The first arrow with dotted line on the lithium niobate film layer (6) represents the light guiding in the lithium niobate film layer (6); and the second arrow with dotted line on the silicon waveguide layer (4) represents the light guiding in the silicon waveguide layer (4).

The function of the optical coupler 42 in the embodiment can be seen in FIG. 4.

In the embodiment, the adhesive layer 5 is made of benzocyclobutene (BCB).

In the embodiment, by using the large-scale integration method of the silicon-based lithium niobate film electro-optic modulator array, the large-scale silicon-based lithium niobate film electro-optic modulator array can be simultaneously fabricated at one time.

Figure 1D:
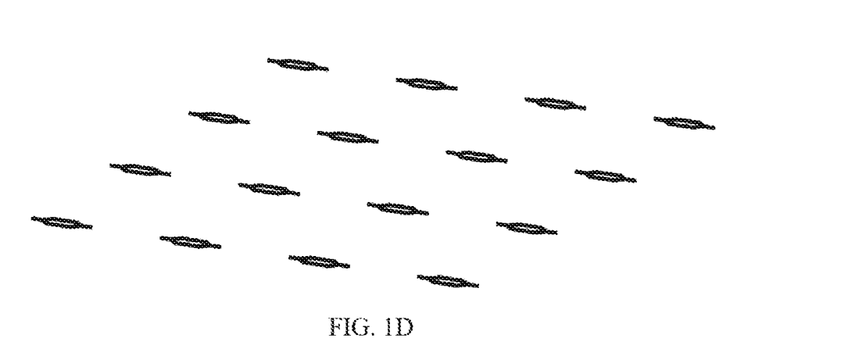
Figure 5A:
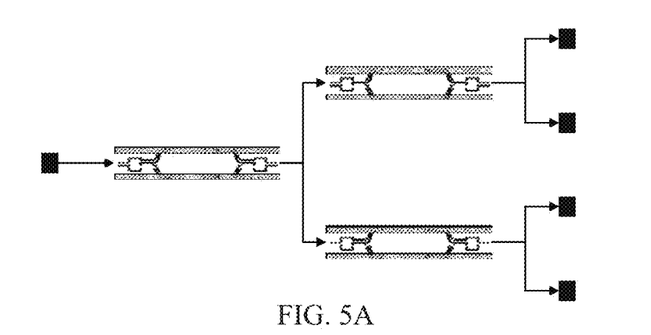
Figure 5B:
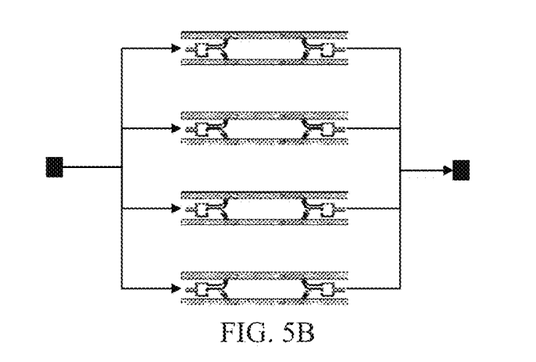
Figure 5C:
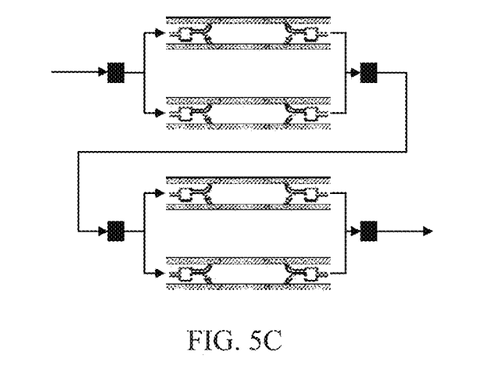

In design and fabrication of the silicon waveguide layers, the design of wafer-level large-scale silicon waveguide layers needs to be completed. Because arrangement positions of the plurality of silicon-based lithium niobate film electro-optic modulators 1 (hereinafter also referred to as "modulators" for short), interconnection between the modulators, and the optical splitters and optical couplers inside the modulators all need to be designed in the silicon waveguide layers, the design of the silicon waveguide layers includes design of modulator arrangement, design of the waveguide interconnection structure, and design of the optical splitters and the optical couplers. Referring to FIG. 1D, the modulator arrangement in the embodiment is in a grid form. Referring to FIGS. 5A to 5C, the design of waveguide interconnection can form multiple connection modes of the modulators, such as cascading connection, parallel connection, hybrid connection, etc.; and inside each modulator, the design of two front and rear optical splitters 41 can be seen in FIG. 2A, and the design of two front and rear optical couplers 42 can be seen in FIGS. 2A through 2C.

In design and fabrication of the direct-current bias electrode layer, the design of wafer-level large-scale direct-current bias electrodes 7 needs to be completed. After the silicon waveguide layers are designed and fabricated, the direct-current bias electrodes 7 are added to regions where a direct-current bias is to be applied to the silicon waveguides. The specific design can be seen in FIGS. 2A to 2C. The direct-current bias electrode layer is fabricated according to the design.

In design and fabrication of the lithium niobate film layer, periodic ridge structures need to be designed on the wafer-level lithium niobate film layer 6 according to the design of the silicon waveguide layers, and the periodic ridge structures are used for enhancing the binding effect on light when the lithium niobate guides light. As the modulators are arranged in the grid form according to the embodiment, the ridge structures of the lithium niobate film layer 6 is designed to be periodic strip structures (referring to FIG. 1C) and are vertically aligned with the optical couplers 42 in the silicon waveguide layers 4, so that light can be smoothly coupled from the silicon waveguide layers 4 to the lithium niobate film layer 6, and also can be smoothly coupled from the lithium niobate film layer 6 to the silicon waveguide layers 4.

In design and fabrication of the radio-frequency electrode layer, the design of wafer-level large-scale radio-frequency electrodes 8 needs to be completed. After the lithium niobate film layer 6 is designed and fabricated, the radio-frequency electrodes 8 are added to regions where a radio-frequency signal is to be applied to the lithium niobate film layer. The specific design can be seen in FIGS. 2A to 2C. The radio-frequency electrode layer 8 is fabricated according to the design.

Figure 2B:
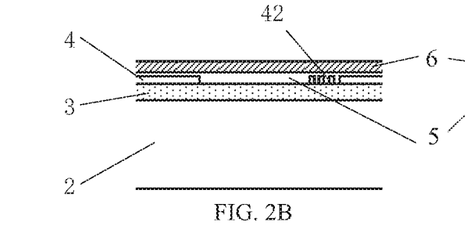

As can be seen in FIG. 2B, after the direct-current biasing process of the silicon waveguide layer 4 is completed, the silicon waveguide layer 4 is etched to form the evanescent wave optical coupler 42, and light enters the lithium niobate film layer 6 to be transmitted. After the radio-frequency signal application in the lithium niobate film layer 6 is completed, under the action of the waveguide grating coupler 42, light returns again to the silicon waveguide layer 4 to be transmitted and in turn can be connected to other modulators.

Figure 2C:
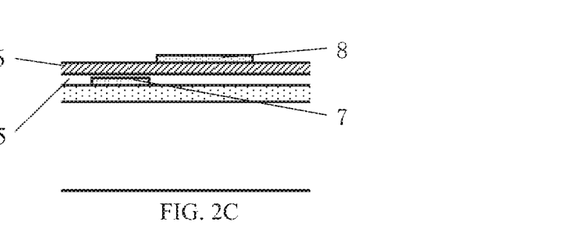

FIG. 2C shows level distribution of the direct-current bias electrode layer 7 and the radio-frequency electrode layer 8 in the embodiment. In order to achieve a better direct-current biasing effect, the direct-current bias electrode layer 7 is located above the silicon dioxide film layer 3 and is in the same level as the silicon waveguide layer 4. Thus, the influence of the electric field on the effective refractive index of the silicon waveguide layer 4 can be improved, thereby improving the direct-current biasing effect. Similarly, in the embodiment, the radio-frequency electrode layer 8 is located above the lithium niobate film layer 6, so that the influence of the electric field on the effective refractive index of the lithium niobate film layer 6 can be improved, thereby improving the effect of applying the radio-frequency signal.

Figure 3A:
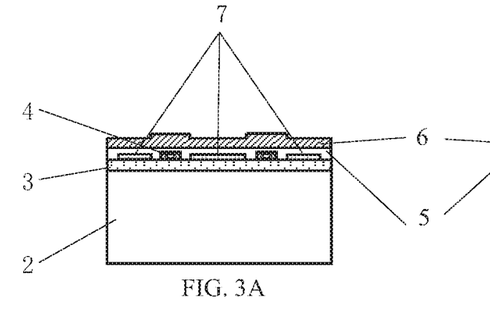
FIG. 3A shows the optical mode field distribution when a silicon waveguide layer is guiding light, corresponding to a cross sectional diagram of regions of the direct-current bias electrode layer (7) in FIG. 2A.
Figure 3B:
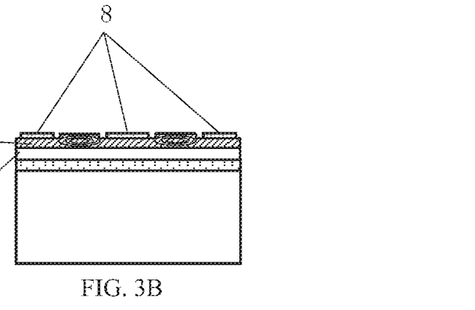
FIG. 3B shows the optical mode field distribution when a lithium niobate film layer is guiding light, corresponding to a cross sectional diagram of regions of the radio-frequency electrode layer (8) in FIG. 2B, where the concentric circles represent optical mode field.

FIGS. 3A and 3B show the optical mode field distribution in different regions. FIG. 3A shows that during the direct-current biasing process, light is limited in the silicon waveguide layer 4 to be transmitted. FIG. 3B shows that during the radio-frequency signal application process, light is limited in the lithium niobate film layer 6 to be transmitted.

FIG. 4 shows a schematic diagram of the waveguide optical coupler 42 of the embodiment. After the radio-frequency signal application process is completed, light transmitted in the lithium niobate film layer 6 is diffracted under the action of the grating coupler 42 and enters the silicon waveguide layer 4 to be further transmitted.

According to the method of the present invention, the advantage in maturity of the standardized silicon-based integration technology is utilized, and a complex chip fabrication process is concentrated in the silicon crystal layers, so that technology errors in the chip fabrication process are reduced, and performance stability of the whole silicon-based lithium niobate film electro-optic modulator array is guaranteed.

We claim:

1. A method for integrating a silicon-based lithium niobate film electro-optic modulator array, comprising:
    (1) oxidizing a smooth silicon crystal substrate (2) by thermal oxidation to form a silicon dioxide film layer (3);
    (2) depositing polycrystalline silicon with a certain thickness on the silicon dioxide film layer (3) by chemical vapor deposition (CVD), and forming silicon waveguide layers (4) with a plurality of silicon-based lithium niobate film electro-optic modulators (1) arranged in an array by dry etching or wet etching, wherein the silicon waveguide layers (4) comprise optical splitters (41) and optical couplers (42) of all the electro-optic modulators arranged in the array, an input terminal of each of the optical splitters (41) is an incident light port, and an output terminal of each of the optical couplers (42) is a modulated light output port; and optical output ports and optical input ports between the modulators are interconnected to form a cascading, parallel or hybrid structure;
    (3) for each electro-optic modulator (1) in an array, performing ion implantation on two sides of the silicon waveguide (4) where a direct-current voltage is to be applied, wherein phosphorus ions are implanted on one side while boron ions are implanted on the other side to form a PN junction across the silicon waveguide;
    (4) forming a metal layer on the silicon waveguide layers (4) by chemical vapor deposition, and removing excess metal by a dry etching process to form metal connection lines only above the PN junctions and form metal lines connected to the outside such that a direct-current bias electrode layer (7) and direct-current bias input ports are made;

(5) etching a wafer-level lithium niobate wafer by dry etching or wet etching to form periodic ridge structures to fabricate a lithium niobate film layer (6), and covering all the N silicon waveguide layers (4) arranged in the array with the lithium niobate film layer (6);

(6) aligning the ridge structures on the lithium niobate film layer (6) with the optical couplers (42) arranged in the array in the silicon waveguide layers (4), and bonding the lithium niobate film layer (6) and the silicon waveguide layers (4) by using an adhesive (5); and (7) forming a metal layer on the lithium niobate film layer (6) by chemical vapor deposition, and then removing excess metal by dry etching or wet etching while only leaving, for each electro-optic modulator, radio-frequency metal electrodes in regions where a radio-frequency signal is to be applied and radio-frequency electrode metal connection lines connected to the outside to form a radio-frequency electrode layer (8) and radio-frequency signal input ports; thus obtaining the array integrating N electro-optic modulators having 2*N optical splitters (41) arranged in the array, 2*N optical couplers (42) arranged in the array, N direct-current voltage input ports and N radio-frequency input ports.

2. The method of claim 1, wherein the optical splitters (41) are multimode interferometer structures or evanescent wave optical splitter structures.

3. The method of claim 1, wherein the optical couplers (42) are waveguide grating couplers or evanescent wave couplers.

4. The method of claim 1, wherein the modulators in the silicon-based lithium niobate film electro-optic modulator array are arranged in a grid form or in a honeycomb form.

5. The method of claim 4, wherein the ridge structures are lateral periodic strip structures or Mach-Zehnder interference structures in a grid form.

6. The method of claim 1, wherein the ridge structures are lateral periodic strip structures or Mach-Zehnder interference structures in a grid form.

7. A silicon-based lithium niobate film electro-optic modulator array prepared by the method of claim 1, comprising, from bottom to top:

the silicon crystal substrate layer (2), the silicon dioxide film layer (3) on top of the silicon crystal substrate layer (2), the silicon waveguide layer (4) on top of the silicon dioxide film layer (3) and comprising a plurality of silicon-based lithium niobate film electro-optic modulators arranged in an array, the direct-current bias electrode layer (7) located above the silicon dioxide film layer (3) and in a same level as the silicon waveguide layer (4), wherein the direct-current bias electrode layer (7) is arranged in regions where a direct-current bias is applied to the silicon waveguide layers (4), the adhesive layer (5), the lithium niobate film layer (6) on top of the adhesive layer, wherein the lithium niobate film layer (6) is bonded to the silicon waveguide layer (4) by the adhesive layer (5), and the radio-frequency electrode layer (8) in a same level as the lithium niobate film layer (6), wherein the radio-frequency electrode layer (8) is arranged in regions where a radio-frequency signal is applied to the lithium niobate film layer (6).

8. The silicon-based lithium niobate film electro-optic modulator array according to claim 7, wherein the plurality of the silicon-based lithium niobate film electro-optic modulators (1) in the array are periodically arranged.

9. The silicon-based lithium niobate film electro-optic modulator array according to claim 7, wherein each of the silicon-based lithium niobate film electro-optic modulators (1) in the array comprises one optical input port, one optical output port, one direct-current input port, and one radio-frequency input port.

10. The silicon-based lithium niobate film electro-optic modulator array according to claim 9, wherein the plurality of the silicon-based lithium niobate film electro-optic modulators in the array in the silicon waveguide layer (4) form a cascading, parallel, or hybrid waveguide interconnection structure.

11. The silicon-based lithium niobate film electro-optic modulator array according to claim 10, wherein the waveguide interconnection structure are formed by interconnecting the optical output ports and the optical input ports between the silicon-based lithium niobate film electro-optic modulators in the array; and each of the silicon-based lithium niobate film electro-optic modulators comprises the optical splitters (41) and the optical couplers (42).

12. The silicon-based lithium niobate film electro-optic modulator array according to claim 11, wherein the optical splitters (41) are multimode interferometer structures or evanescent wave optical splitter structures.

13. The silicon-based lithium niobate film electro-optic modulator array according to claim 11, wherein each optical splitter (41) comprises one or two optical output ports.

14. The silicon-based lithium niobate film electro-optic modulator array according to claim 11, wherein the optical couplers (42) are waveguide grating couplers or evanescent wave couplers.

15. The silicon-based lithium niobate film electro-optic modulator array according to claim 7, wherein the modulators in the silicon-based lithium niobate film electro-optic modulator array are arranged in a grid form or in a honeycomb form.

16. The silicon-based lithium niobate film electro-optic modulator array according to claim 7, wherein ridge structures are formed on the lithium niobate film layer (6) by etching, and the ridge structures are lateral periodic strip structures or Mach-Zehnder interference structures in a gird form.

* * * * *